C. WALKER.
Rice Huller.
No. 6,644.
Patented Aug. 14, 1849.
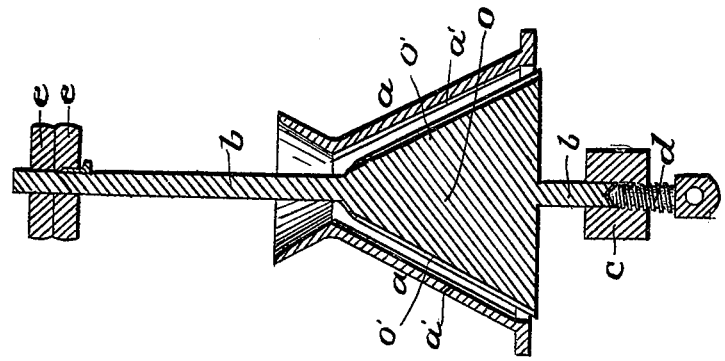
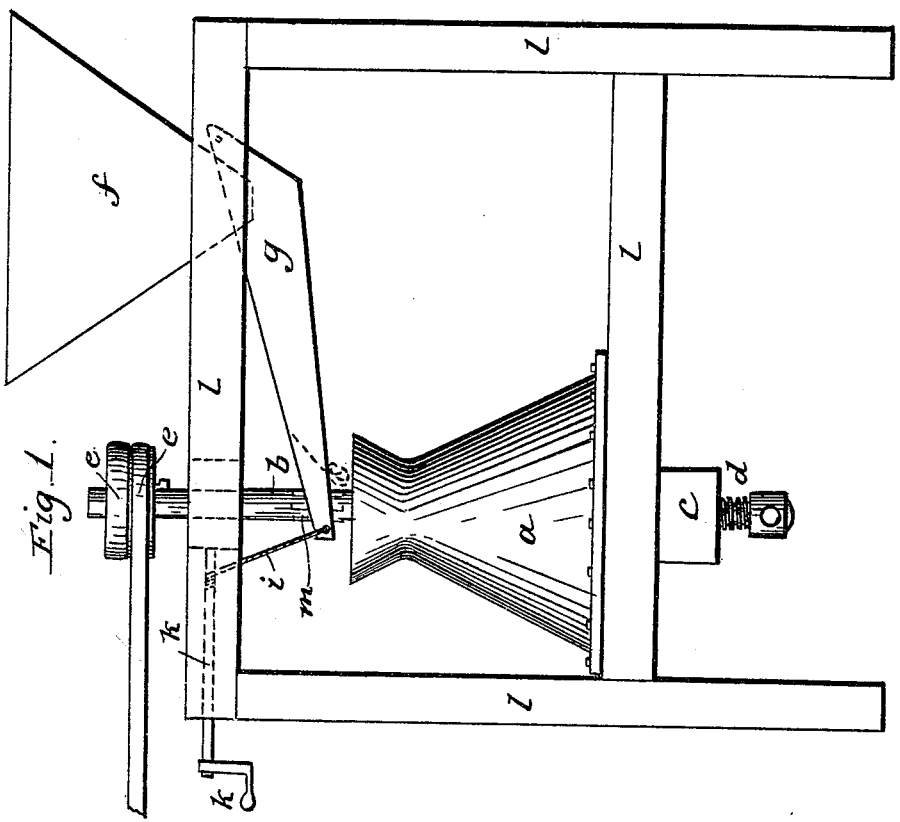

UNITED STATES PATENT OFFICE.

CHARLES WALKER, OF BROOKLYN, NEW YORK.

RICE-HULLER.

Specification of Letters Patent No. 6,644, dated August 14, 1849.

*To all whom it may concern:*

Be it known that I, CHARLES WALKER, of Brooklyn, in the county of Kings and State of New York, have invented a New Machine or Mill for Hulling Rice or other Grains; and I do hereby declare the following to be a full, clear, and exact description of the same, reference being had to the annexed drawings, making a part of this specification, in which—

Figure 1, is an elevation of the outside. Fig. 2, is a section, showing the interior.

The nature of my invention consists in providing two conical rings or parts of cast iron, and these to be coated with vulcanized caoutchouc or india rubber, by which the surface of rice or other grain may be rubbed in a severe manner so as to break and peel off the skin or hull of the grains of rice, coffee, or other grains, without pulverizing the inner part or grain itself. Like parts in drawings are represented by like letters of reference.

I construct or cast a hollow double cone, in one piece as (a) in drawings, the upper parts or cone serving as a depository and feeding place to the lower one. The inner side of the lower cone of these two, that is, the hollow one (a) is coated in a firm manner with vulcanized or otherwise prepared caoutchouc, gutta percha or other elastic substances, which forms one of the rubbing surfaces, this will be known as (a'), and is bolted in a suitable way, to the frame. Directly inside of this I place the cone (o) which is cast upon its own shaft, or placed upon it, the shaft being known as (b). This shaft rests upon a regulating screw (d) which is itself set in a bearing piece attached to the frame and known as (c). By the upper part of this shaft the power may be taken on the belt and pulleys (E, E,). This cone (o) is covered in a firm manner with caoutchouc in like manner to the inside of (a) differing only by the coating being on its outer side; and this cone should be made nearly to fit to the inside of the cone (a) when they are both covered with the coats of elastic substance. The regulating screw (d) is to be screwed up or down as occasion may require by which the cones (a and o) will be brought in more close contact, or separated to a greater extent as occasion may require. I also make a hopper of common construction (f) and attach to it a guide trough (g) also of common construction, with its knockers on the shaft as (m). At its extreme end a cord (i) is attached which is carried to the screw guide (k) and by taking up or letting it out, is the end of the guide trough raised or lowered to let the grain into the lower part of the conical surfaces in greater or less quantity, as is common in flouring mills. The whole is placed upon the frame (l); and is operated by filling the hopper with the grain and setting the shaft and its cone (o) in motion, when the grain falls into it the lower cone and between the two cones, in the usual way, and the rubbing of it against the elastic surfaces of the two cones breaks and peels off the skin or hull leaving the other part of the kernel in a whole state, and ready for grinding.

What I claim as my invention and desire to secure by Letters Patent, is—

Covering the rubbing cylinder and concave or other rubbing surfaces of rice or other grain hullers with vulcanized india rubber in the manner herein described and set forth.

CHARLES WALKER.

Witnesses:
J. L. KINGSLEY,
J. P. PIRSSON.